United States Patent [19]
Frankiw et al.

[11] 3,955,472
[45] May 11, 1976

[54] MACHINE TOOL STRUCTURE FOR NOISE REDUCTION
[75] Inventors: Walter Frankiw, Detroit; Raymond S. Kusz, Mount Clemens, both of Mich.
[73] Assignee: Lear Siegler, Inc., Santa Monica, Calif.
[22] Filed: July 22, 1974
[21] Appl. No.: 490,358

[52] U.S. Cl. .............................. 90/86; 181/33 A; 248/13; 408/234
[51] Int. Cl.² ...................................... B23D 41/06
[58] Field of Search .................... 248/13, 19, 20; 408/234; 90/63, 86; 181/33 A, 175

[56] References Cited
UNITED STATES PATENTS
2,065,219   12/1936   Ferris .................................. 90/86
3,348,795   10/1967   Schilling ..................... 408/234 X FOREIGN PATENTS OR APPLICATIONS
1,569,725   3/1968   France ................................. 90/86

Primary Examiner—Travis S. McGehee
Assistant Examiner—W. R. Briggs
Attorney, Agent, or Firm—Whittemore, Hulbert & Belknap

[57]     ABSTRACT

Machine tool structure designed to reduce the noise incident to operation. The invention is illustrated and described as applied to a vertical broaching machine in which the frame structure is modified by supporting the operating components on a vertical slab or thick plate reinforced with longitudinally extending ribs and including an open truss type support rather than the conventional hollow or enclosed columnar frame in common use.

15 Claims, 6 Drawing Figures

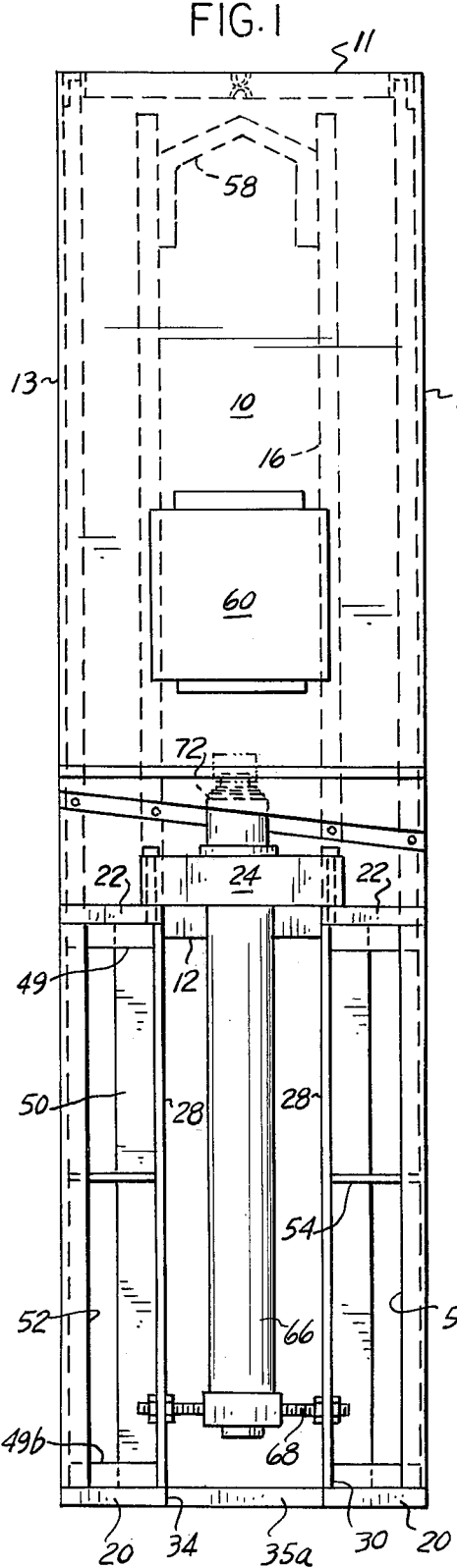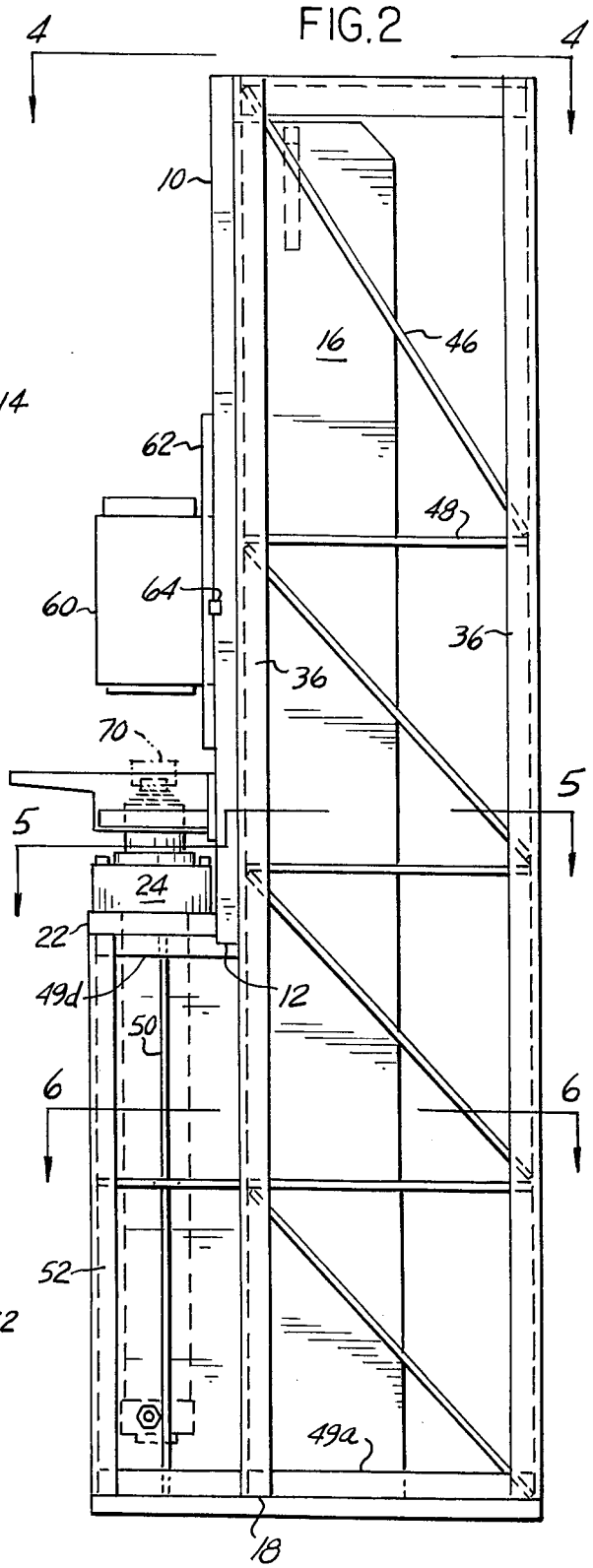

MACHINE TOOL STRUCTURE FOR NOISE REDUCTION

BRIEF SUMMARY OF THE INVENTION

The invention relates to a machine tool, more particularly a metal cutting tool, and specifically a vertical broaching machine designed to produce minimal noise during operation, in which the operating parts are essentially carried by a single relatively heavy vertically extending slab or thick plate. This plate is supported by an open work truss type frame which completely avoids the enclosed columnar type frame commonly found in present-day metal cutting machine tools.

The fact that the operating components of the machine tool are attached directly to a single flat reinforced slab or thick plate apparently avoids noise heretofore generated where the machine tool frame includes an enclosed hollow column. Evidently, such a column acts as a source of sound somewhat in the manner of a bell which is avoided by the present construction.

The present support structure also includes plates or strips which are of substantially different thickness and it is believed that this also tends to reduce the operation in which the supporting frame is caused to vibrate and act as a source of sound.

BRIEF DESCRIPTION OF THE DRAWINGS

FIG. 1 is a front elevation of a vertical broaching machine embodying the present invention.

FIG. 2 is a side elevation of the machine tool shown in FIG. 1.

DETAILED DESCRIPTION

Figure 3:
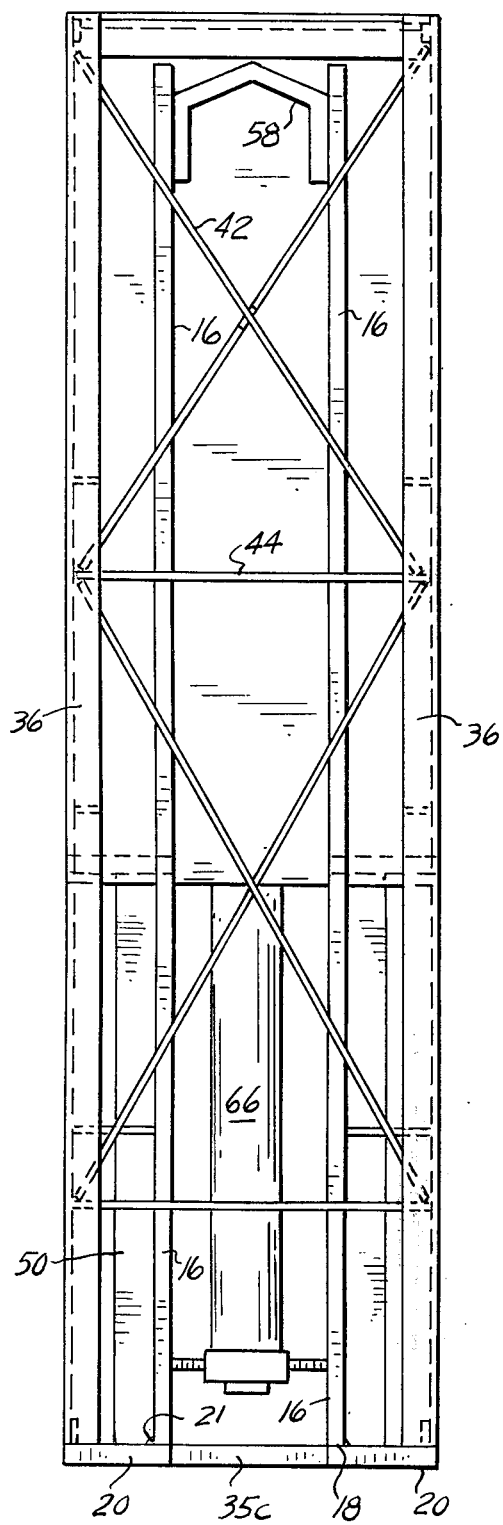
FIG. 3 is a rear elevation of the machine.

The present invention is embodied in a vertical broaching machine in which the broaching tool is in the form of a pot broach comprising a vertically elongated open housing supporting therein a multiplicity of broach type cutting tools. The assembly is known to the industry as a pot broach. The broach type cutting tools may be in the form of a multiplicity of internally toothed rings, where the work piece is to be formed with external radially extending projecting teeth, such as in a gear or spline. Alternatively, the broach type cutting tools may be in the form of elongated tools referred to as sticks each of which is provided with a longitudinally extending series of teeth of graduated height.

The work piece is in the form of a disc or annular member which is caused to have a relative movement with respect to the pot broach which is longitudinal thereof. Such relative movement may of course be provided by moving the pot broach fixture relative to the work piece or by moving the work piece relative to the pot broach fixture. In the present machine, which is referred to as a push-up pot broach, the broach fixture is mounted in fixed position and the work piece is pushed vertically upwardly through the fixture, emerging at the top in fully broached position, from which it is removed by suitable means, while the pusher which moved the work piece through the broach is returned downwardly to receive a succeeding work piece.

It is a characteristic of tooth cutting broaches, where cuts are taken simultaneously around the periphery of a usually cylindrical work piece, that a multiplicity of cuts are initiated simultaneously or substantially simultaneously and that a succession of cuts is caused to take place as the space between each pair of adjacent teeth is gradually cut to depth. As a result of the foregoing the broaching operation is characterized by the initiation of a great multiplicity of cutting actions, all of which tend to produce an inherently noisy operation.

In some cases the teeth of the broaching fixture are arranged such that the most nearly circumferentially aligned cutting teeth are arranged with suitable axial displacement so that the impacts between a cutting tooth on the broach and the work piece are caused to take place in sequence, so that the number of teeth simultaneously impacting on the work piece is materially reduced.

The harmful effect of noise on machine tool operators has long been recognized, and recently the governmental agency OSHA has issued regulations which limit the decibel output of any machine tool. For example, OSHA regulations currently require the noise of operation of a machine tool to be less than 90 decibels.

A vertical pot broaching machine of the type disclosed herein as it has heretofore been manufactured, comprised a vertical frame usually in the form of a hollow cast or fabricated column. It has of course been recognized that the columnar construction offers material advantages in rigidity, as well as affording interior space in which machine tool components can be housed. It was found, however, that a broaching machine tool of the character described, employing the hollow cast or fabricated frame, far exceeded the permissible noise level.

In an effort to reduce the noise of the pot broaching machine numerous expedients were tried, none of which were effective to bring the noise output to below the permissible level.

Since it was believed that the noise might be attributable to vibration, many different forms and arrangements of internal braces were applied, but in general, while this reduced the noise output by a measurable amount, it failed to bring it within the permissible level.

Another expedient which was tried was to provide transverse curvature to the front wall of the column and also to the rear and side walls thereof. In a specific example the flat front plate of a fabricated column was bent to have a transverse displacement of about 1½ inches with reference to its side edges.

Another unsuccessful attempt to reduce the noise output was by burning holes in the top wall of the enclosed column.

Pads of hard plastic material were interposed between the column and the means for mounting the pot broach and between the work support and the actuating means therefor.

Heavy layers of sound absorbing material were sprayed onto the inner surface of the column. Polyurethane was poured in fluid form so as to completely fill all spaces within the broaching pot between the cutting elements and the outer enclosing support therefor.

Instead of bolting the pot broaching fixture to the column, it was attached thereto by special clamps, and also by the provision of straps, neither of which produced the required results.

Since it was recognized that a possible explanation for the decibel output was in the vibration of the column, an effort was made to reduce the noise output by suspending a movable clapper in contact with the outer surface of the column. Finally, a heavy lead plate was freely suspended inside the column in the hope that it would absorb sound energy and thus reduce the decibel output.

A number of the foregoing expedients were tried together and while some or all of them had a measurable effect in reducing the noise output, it was impossible even by employing all of the expedients together, to reduce the noise output to acceptable levels.

Finally, it was decided to depart completely from the columnar frame construction and to simplify the support by attaching the operating components (the broach fixture and the work actuating mechanism) directly to a single flat slab or thick plate. Since it was recognized that this plate, even though of very substantial thickness, would have measurable deflection under loads anticipated in broaching, the plate was reinforced by longitudinally extending ribs. These ribs, while of substantial thickness, were deliberately made to have a thickness substantially different from and specifically less than the thickness of the slab.

Inasmuch as the machine was to be a vertical broach, it was necessary to provide support structure to support the slab and operating structure carried thereby in operating position, and this was accomplished in general terms by providing a substantially open truss type frame in which all components were in the form of angle irons or bars or straps, and no flat plate-like elements capable or reverberation were provided.

The first broaching machine constructed in accordance with this concept showed an astonishing reduction in noise during operation. While some of the broaching machines as previously tested could be operated far below their output capabilities with a sufficient reduction in noise to pass the OSHA requirements, the machine constructed in accordance with the present invention could be operated at its maximum designed speed and still operate within the permissible noise output.

Referring now to the drawings, the primary slab or other plate which constitutes the essential support structure for the operating components of the machine is designated at 10, having an upper edge 11, a bottom edge 12, and side edges 13 and 14. In a specific embodiment of the invention this slab or thick plate had a thickness of 2½ inches, a vertical height of 74 inches, and a width of 38 inches.

While this slab or thick plate is obviously of very considerable strength, it is recognized that the forces developed during a broaching operation might cause deflection thereof. Accordingly, the plate 10 is reinforced by vertically extending ribs 16 preferably welded throughout their overlapping length to the rear surface of the plate 10, but extending below thereof so that the lower edges of the ribs 16, as indicated at 18, rest on floor support plates 20 to which they are preferably welded as indicated at 21.

Integrally attached as by welding to the front surface of the plate 10 adjacent the bottom edge 12 thereof are a pair of horizontal support plates 22. These plates, as best indicated in FIG. 2, constitute a support for a mounting plate 24 which supports the hydraulic cylinder, as will subsequently be described.

In order to cause the support plates 22 to constitute in effect a rigid integral part of the support plate 10, the plates 22 at their inner surfaces are connected to plates 28 which are welded or otherwise secured to the underside of the plates 22 and which extend all the way down to the floor plates 20 to which they are welded as indicated at 30.

From the foregoing it will thus be observed that the plates 28 constitute forward extensions of relatively thicker reinforcing plates or ribs 16 to which they are preferably welded as indicated at 32.

The floor plates 20 to which the lower edges of the plates or ribs 16 and 28 are secured as by welding, extend from the front to back of the machine as best illustrated in FIG. 2, and are separated so that the inner edges thereof, indicated at 34, are spaced apart as indicated in FIG. 1.

The floor plates 20 are interconnected by bars 35a, 35b, and 35c at the front, the middle portion thereof, and the rear, respectively.

Figure 4:
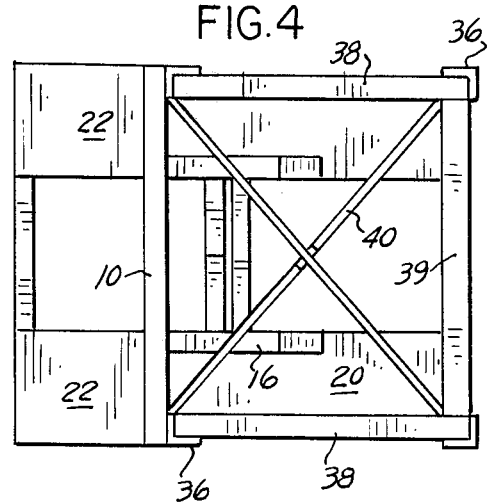
FIG. 4 is a plan view looking downwardly as indicated by the arrows 4—4, FIG. 2, with broaching components omitted.
Figure 5:
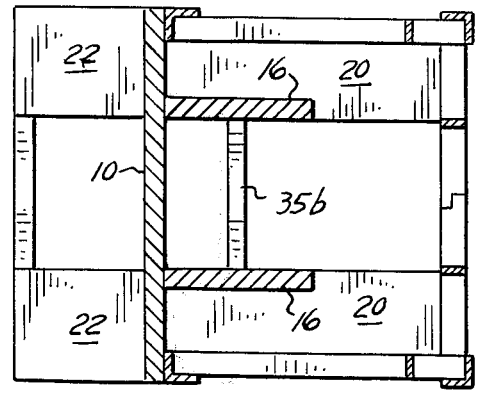
FIGS. 5 and 6 are sectional views on the lines 5—5 and 6—6, FIG. 2, with broaching components omitted.
Figure 6:
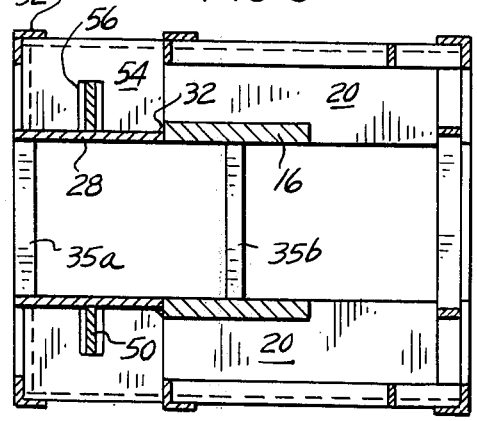

Open truss type support structure is provided which as illustrated comprises four vertical angle irons 36 disposed to define the corners of the open truss work column. The upper ends of the angle irons 36 are interconnected by the top of the plate 10 and also by angle irons 38 and 39. In addition, cross braces 40 located at the top of the truss work frame are provided as best illustrated in FIG. 4.

The lower ends of the angle irons 36 are welded to floor plates 20.

Intermediate their upper and lower ends the angle iron frame pieces 36 are interconnected by diagonal and horizontal truss elements. As viewed from the rear, the rearmost vertical angle irons 36 are connected by the diagonal truss elements 42 and horizontally extending truss elements 44, the ends of which are suitably interconnected to each other and to the angle irons 36 by welding. At the sides, as best illustrated in FIG. 2, the side angle irons 36 are interconnected by inclined truss members 46 and horizontal truss members 48 the ends of which are suitably welded together and to the vertical angle irons 36. In addition, the truss frame may include reinforcing and tie strips such as indicated at 49a, 49b, 49c, 49d, and the like.

The vertical plates 28 which extend downwardly from the inner edges of the horizontal plates 22 are reinforced by ribs 50. The front outer corners of each of the plates 22 are connected to vertically extending angle irons 52 which extend downwardly and are welded at their ends to the plates 22 and to the floor plates 20. Thus, the supporting plates 22 are rigidly supported by the relatively wide plates 28 extending to full depth of the plates at the inner edges thereof, by the angle irons 52 at the outer front corners thereof and by the connection through the plate 10 to the front angle irons 36. In addition, the support plates 28 are connected to the adjacent angle irons 36 and 52 by an intermediate horizontal plate 54 having openings 56 formed therein for the reception of the reinforcing ribs 50.

Conveniently, the reinforcing or stiffening plates 16 may be interconnected at their tops by an inverted U-shaped hanger 58 by which the frame and/or machine tool may be lifted.

The pot branch tooling holder is indicated at 60 and is carried by a mounting plate 62 which is keyed as indicated at 64 to the plate 10 and which is in addition secured thereto by suitable bolts (not shown). It will of course be understood that the vertical height of the broach tooling holder 60 depends upon the work piece, and a substantially greater height broach tooling holder will be required for a work piece in which relatively deep tooth spaces are to be broached.

The broach tooling holder is maintained in this position during operation of the machine and the work piece is pushed upwardly through the broach during which passage it is completely machined to the required form and is removed at the top of the broach. In order to provide for vertical upward movement of the work piece there is provided a hydraulic cylinder 66 the upper end of which is suitably secured to the mounting plate 24 and the lower end of which is attached by threaded fasteners 68 to the reinforcing plates 28. In operation a work piece such for example as indicated at 70, may be placed manually or by suitable automatic loading mechanism onto the work supporting fixture 72 which is connected to the piston rod of a piston slidable vertically in the cylinder 66. The piston rod is guided at the upper end of the cylinder 66 and as soon as the work piece carried by the fixture 72 enters the broach, the engagement between the work piece and broach provide a supporting and guiding action as the work piece traverses the multiplicity of cutting teeth within the broach.

From the foregoing it will be observed that the main support plate or slab 10 reinforced by the ribs 16, constitutes the support for the broach tooling holder and this support, by virtue of the fact that the ribs 16 extend to and are welded to the floor plates 20, in effect supports the broach fixture directly from the supporting foundation which carries the machine. In addition, the work moving mechanism is mounted directly to the support plates 22 which in turn are welded to the lower end of the main support plate 10 and which are themselves further supported by plates 28, extending between and welded to plates 22 and floor plates 20. Plates 28 are provided with reinforcing ribs 50 which also extend between and are welded to plates 22 and floor plates 30. In addition, plates 22 are supported by angle irons 52 which extend between and are welded to plates 22 and floor plates 20, and by angle irons 36, to which they are solidly connected by the lower end of main support plate 10.

Reference was previously made to the fact that the major components of the frame are deliberately made of different thicknesses to avoid, so far as possible, sympathetic or induced vibrations during the broaching operation. The main support plate as provided in the machine illustrated herein, has a thickness of 2½ inches. The supporting ribs 16 have a thickness of 2 inches. The support plates 28 have a thickness of 1 inch, and the floor plates 20 have a thickness of 2 inches.

The quiet operation of the machine is believed to be attributable to the use of the heavy thick relatively wide slab-like supporting plate. The specific dimensions of this plate as described in the foregoing, show a thickness in excess of 2 inches, a width in excess of 3 feet, and a height in excess of 6 feet. These specific dimensions are of course not essential but in order to produce minimum noise during operation it is believed the thickness of the plate should be at least 2 inches and the width and height or length of the plate should both be at least 2 feet.

What we claim as our invention is:

1. A machine tool characterized in minimal noise production during operation, said tool having a generally rectangular, heavy, solid, unitary, metal, slab-like main support plate, rib means integrally secured to one side of said plate and extending from one transverse edge at least substantially to the opposite edge of said plate and spaced inwardly from the remaining longitudinal edges of said plate, a first machine component rigidly secured to one side of said plate, an open truss-like frame structure connected to said plate, and said frame structure including means extending to the bottom of said plate to provide support for said plate directly from a supporting floor, and a second machine tool component in operative juxtaposition to said first component.

2. A machine tool as defined in claim 1 in which said machine tool is a metal cutting tool, and said components are a work support and a cutting tool support.

3. A machine tool as defined in claim 1 in which said machine tool is a broaching machine, one of said components being a broaching tool, the other of said components being a work support, and means for effecting relative movement between said components longitudinally of said broaching tool.

4. A machine tool as defined in claim 3 in which said broaching tool is fixed to said slab-like plate.

5. A machine tool as defined in claim 4 in which said second component is a movable work support, and actuating and guide means connected directly between said plate and said movable work support.

6. A machine tool as defined in claim 5 in which the means connecting said actuating and guide means to said plate comprises a pair of spaced secondary support plates rigidly connected at their edges to said main support plate to extend laterally therefrom, said actuating and guide means being rigidly connected to said secondary support plates.

7. A machine tool as defined in claim 6 in which said main plate is vertical, said secondary plates being connected to said main plate adjacent its lower end and extending horizontally therefrom.

8. A machine tool as defined in claim 7, said frame structure comprising base plates, said rib means comprising a pair of ribs extending below said main plate to said base plates are rigidly secured thereto throughout their lower edges, and vertically elongated flat frame elements rigidly secured at their upper edges to said secondary support plates, at their lower edges to said base plates, and at vertically extending side edges thereof to the portions of said ribs below the lower edge of said main plate.

9. A machine tool as defined in claim 2, said main support plate being vertical, a pair of laterally spaced secondary support plates rigidly connected to said main plate adjacent its lower edge, and means connecting said second component to said pair of plates.

10. A machine tool as defined in claim 9, said frame comprising base plate means, said rib means comprising a pair of vertically extending ribs the lower ends of which extend below the lower edge of said main plate and are rigidly secured to said base plate means.

11. A machine tool as defined in claim 10, said frame including support structure for said secondary plates comprising vertically elongated flat frame elements rigidly secured at their upper edges to said secondary support plates, at their lower edges to said base plates, and at vertically extending side edges thereof to the portions of said ribs below the lower edge of said main plate.

12. A machine tool as defined in claim 2, in which said main plate has a thickness of about 2½ inches, and said rib means are of materially different thicknesses from that of said main plate.

13. A machine tool as defined in claim 9 in which said main plate has a thickness of about 2½ inches, and said secondary support plates are of materially different thickness from that of said main plate.

14. A machine tool as defined in claim 2 in which said main support plate has a thickness of at least 2 inches and a width of at least 2 feet.

15. A machine tool as defined in claim 2 in which said first machine component is secured to the side of said main support plate opposite the side to which said rib means are secured.

* * * * *